United States Patent [19]
Nagai et al.

[11] Patent Number: 6,116,104
[45] Date of Patent: Sep. 12, 2000

[54] ACTUATOR

[75] Inventors: Shigekazu Nagai, Tokyo; Junichi Saito, Kashiwa, both of Japan

[73] Assignee: SMC Kabushiki Kaisha, Tokyo, Japan

[21] Appl. No.: 09/343,525

[22] Filed: Jun. 30, 1999

[30] Foreign Application Priority Data

Jul. 9, 1998 [JP] Japan ................................. 10-194521

[51] Int. Cl.$^7$ ................................................. F15B 15/00
[52] U.S. Cl. ................................. 74/89.15; 74/424.8 R
[58] Field of Search ............................ 74/424.8 R, 89.15

[56] References Cited

U.S. PATENT DOCUMENTS

| | | | |
|---|---|---|---|
| 5,329,825 | 7/1994 | Askins | 74/89.15 |
| 5,349,731 | 9/1994 | Sheehan et al. | 74/89.15 |
| 5,910,192 | 6/1999 | Pulford et al. | 74/89.15 |

*Primary Examiner*—Dirk Wright
*Attorney, Agent, or Firm*—Oblon, Spivak, McClelland, Maier & Neustadt, P.C.

[57] ABSTRACT

A pair of stopper members are mounted on shafts of an actuator in such a manner that stopper members sandwich a table. By making the table come into contact with these stopper members, a stop operation and a determination of a stop position of the table are carried out. To be more specific, the stop operation and the determination of the stop position of the table is carried out by using adjusting bolts which are respectively mounted on the stopper members. Furthermore, an impact which occurs when the adjusting bolts and the table come into contact with each other is attenuated by shock absorbers which are respectively mounted on said stopper members.

13 Claims, 3 Drawing Sheets

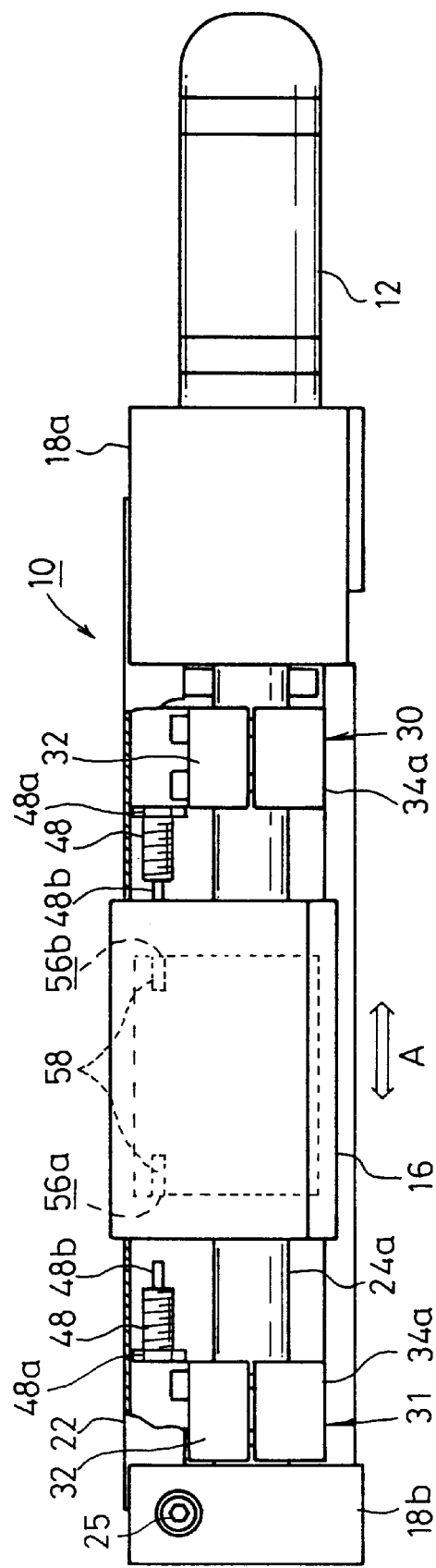

ACTUATOR

BACKGROUND OF THE INVENTION

1. Field of the Invention

The present invention relates to an actuator, and more particularly to an actuator which carries out a stop operation of a table by making the table come into contact with stopper members thus enabling the reduction of the manufacturing cost.

2. Description of the Related Art

As devices for transferring workpieces or the like, actuators have been used conventionally. Among actuators which are used for the above purpose, there is an actuator which adopts a structure where the actuator includes a table that is moved by the rotation of a screw shaft connected to a motor. A workpiece is transferred by this table. Furthermore, this type of actuator is equipped with detection means for detecting the position of the table. Based on the detected information from the detection means, when the table reaches either end of its movable range, a stop operation is carried out.

In the above-mentioned actuator, the driving of the motor requires a control of a high precision based on the detected information from the detection means and hence, the motor inevitably becomes expensive. Accordingly, there arises a problem that the manufacturing cost of the actuator also jumps.

SUMMARY OF THE INVENTION

The present invention is made to overcome the above-mentioned inconveniences and it is an object of the present invention to provide an actuator which can be manufactured at a low cost.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a schematic side explanatory view of the actuator shown in FIG. 1.

DESCRIPTION OF THE PREFERRED EMBODIMENTS

A preferred embodiment of an actuator of the present invention is chosen and is explained hereinafter in conjunction with attached drawings.

Figure 1:
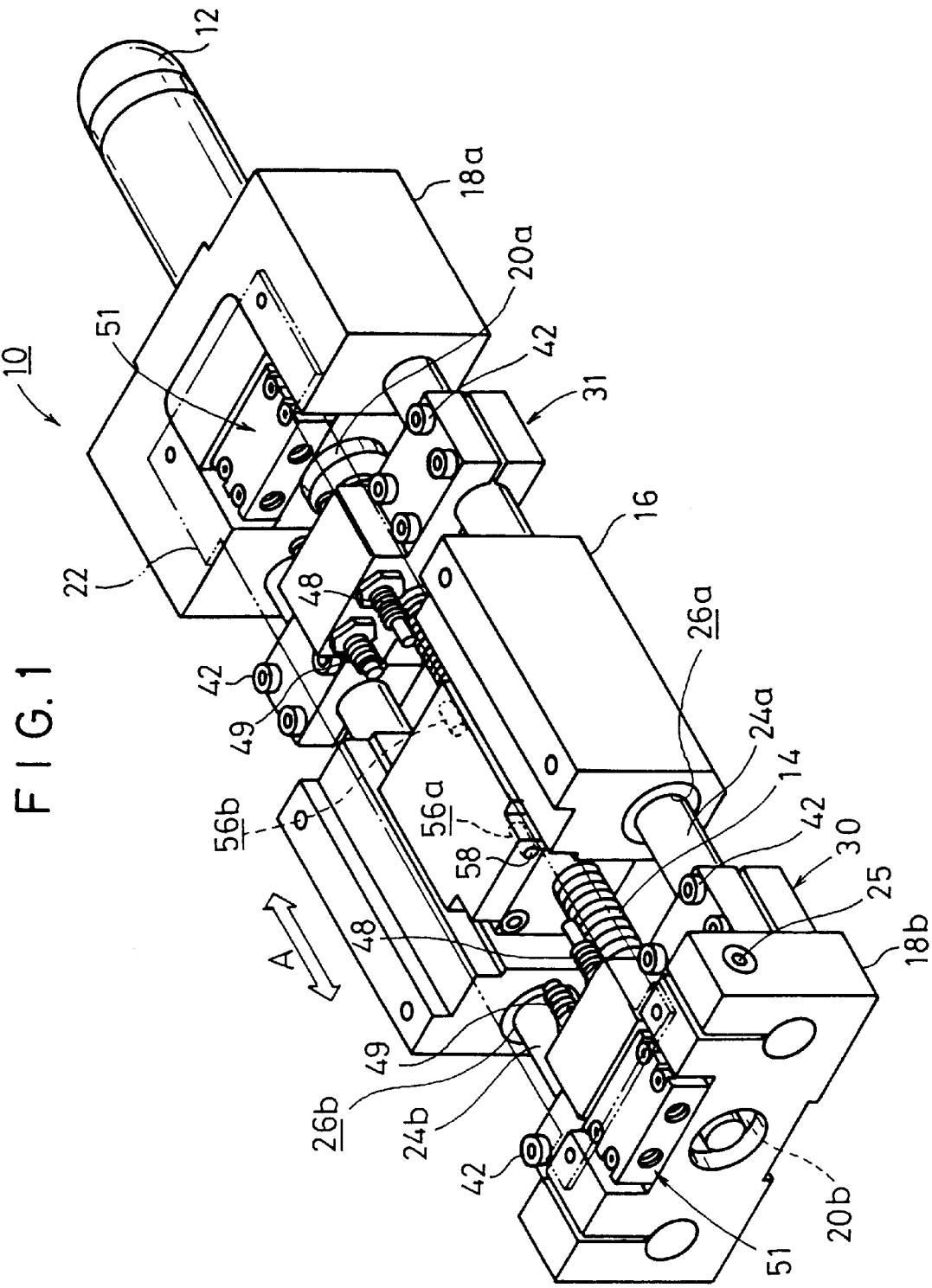
FIG. 1 is a schematic perspective view showing an actuator according to one embodiment of the present invention.

As shown in a schematic perspective view of FIG. 1, an actuator 10 according to the embodiment of the present invention includes a motor 12 as a drive source. The actuator 10 also includes a ball screw (screw shaft) 14 connected with a drive shaft of the motor 12 for transmitting power, and a table 16 engaged with the ball screw 14 and moved along an axial direction (the direction indicated by arrow A in FIG. 1) of the ball screw 14.

It is preferable to use a motor having a torque limiting function (such as a brushless motor) as the motor 12. It is because that the motor 12 is prevented from being given an excessive torque. The motor 12 is driven or stopped by making the supply of an electric current from a power source not shown in drawings ON or OFF. Furthermore, the motor 12 can change its rotating direction by changing the polarity of the electric current supplied from the power source.

The ball screw 14 has both ends thereof rotatably supported by support bearings 20a, 20b which are mounted on support bases 18a, 18b. The motor 12 is fixedly mounted on one support base 18a.

Between the support bases 18a, 18b, a pair of shafts (guide members) 24a, 24b extend over such that they are arranged in parallel to the ball screw 14 and the ball screw 14 is interposed therebetween. At one support base 18a side, these shafts 24a, 24b are fixedly secured by means of screws not shown in drawings, while at other support base 18b side, the shafts 24a, 24b are fixedly secured by a fastening force produced by screws 25.

The table 16 is provided with guide holes 26a, 26b and shafts 24a, 24b pass through these guide holes 26a, 26b. In this case, the table 16 is movable in the direction indicated by arrow A in FIG. 1 due to a guiding action of the shafts 24a, 24b.

As shown in a schematic explored perspective explanatory view of FIG. 2, cover members 22, 23 are fixedly mounted on the support bases 18a, 18b by means of screws 22a, 23a, respectively in such a manner that they sandwich the support bases 18a, 18b from above and below.

A pair of stopper members 30, 31 are mounted on the shaft members 24a, 24b in such a manner that they sandwich the table 16. As shown in FIG. 2, each of the stopper members 30, 31 includes a substrate member 32 which is made of a block body and a pair of fixing members 34a, 34b which are also made of block bodies.

On the lower surfaces of the substrate members 32 which are disposed at the upper side of the shafts 24a, 24b, a pair of groove portions 36a, 36b having a substantially semicircular cross section corresponding to the shape of the shafts 24a, 24b are formed. Furthermore, between the groove portions 36a, 36b, namely at position which faces the ball screw 14, a groove portion 38 having a substantially semicircular cross section is provided in parallel to the above-mentioned groove portions 36a, 36b.

Meanwhile, on the upper surfaces of the fixing members 34a, 34b disposed at the lower side of the shafts 24a, 24b, grooves 40a, 40b having a substantially semicircular cross section corresponding to the shape of the shafts 24a, 24b which is similar to that of the groove portions 36a, 36b are respectively formed.

The fixing members 34a, 34b and the substrates 32 are mounted on the shafts 24a, 24b in such a manner that they sandwich the shafts 24a, 24b between the groove portions 36a, 36b and the groove portions 40a, 40b. In this case, the fixing members 34a, 34b and the substrate members 32 are fixedly mounted on the shafts 24a, 24b due to a fastening force generated by screw members 42 and working therebetween.

The grooves 38 are formed in the substrates 32 at portions which face the ball screw 14 in an opposing manner. Accordingly, in a condition that the fixing members 34a, 34b and the substrates 32 are mounted on the shafts 24a, 24b, the contact between the ball screw 14 and the substrate members 32 is obviated.

The substrates 32 are provided with projections 44 at substantially central portions on the upper surfaces thereof.

A pair of holes 46a, 46b which are arranged close to each other and penetrate the projections 44 along the axial direction of the ball screw 14 are formed in these projections 44. Shock absorbers 48 and adjusting bolts 49 are screwed into these holes 46a, 46b respectively.

Nut members 48a, 49a are mounted on the shock absorbers 48 and the adjusting bolts 49, respectively. Using these nut members 48a, 49a, the positions of the distal ends of the shock absorbers 48 and the adjusting bolts 49 are determined.

Rods 48b are inserted in the distal end portions (end portions of the table 16 side) of the shock absorbers 48 in a reciprocating manner and these rods 48b are biased in a direction toward distal ends thereof by springs which are mounted inside the shock absorbers 48 although not shown in drawings.

On the other hand, damper members 49b made of polyurethane or the like are provided to the distal end portions of the adjusting bolts 49.

The distal end portions (the rods 48b and damper members 49b) of the shock absorbers 48 and the adjusting bolts 49 which are respectively mounted on the stopper members 30 and 31 face each other in an opposing manner while the table 16 is interposed therebetween.

The distance (protruding distance) from the projections 44 to the distal ends of the shock absorbers 48 and the adjusting bolts 49 can be finely adjusted by shifting the positions of the nut members 48a, 49a.

As shown in a schematic side explanatory view of FIG. 3, the movable range of the table 16 is restricted by the contact of the table 16 with the adjusting bolts 49. Accordingly, the retracting distance of the rods 48b relative to the shock absorbers 48 depends on the position of the distal end portions (damper members 49b) of the above-mentioned adjusting bolts 49.

Figure 2:
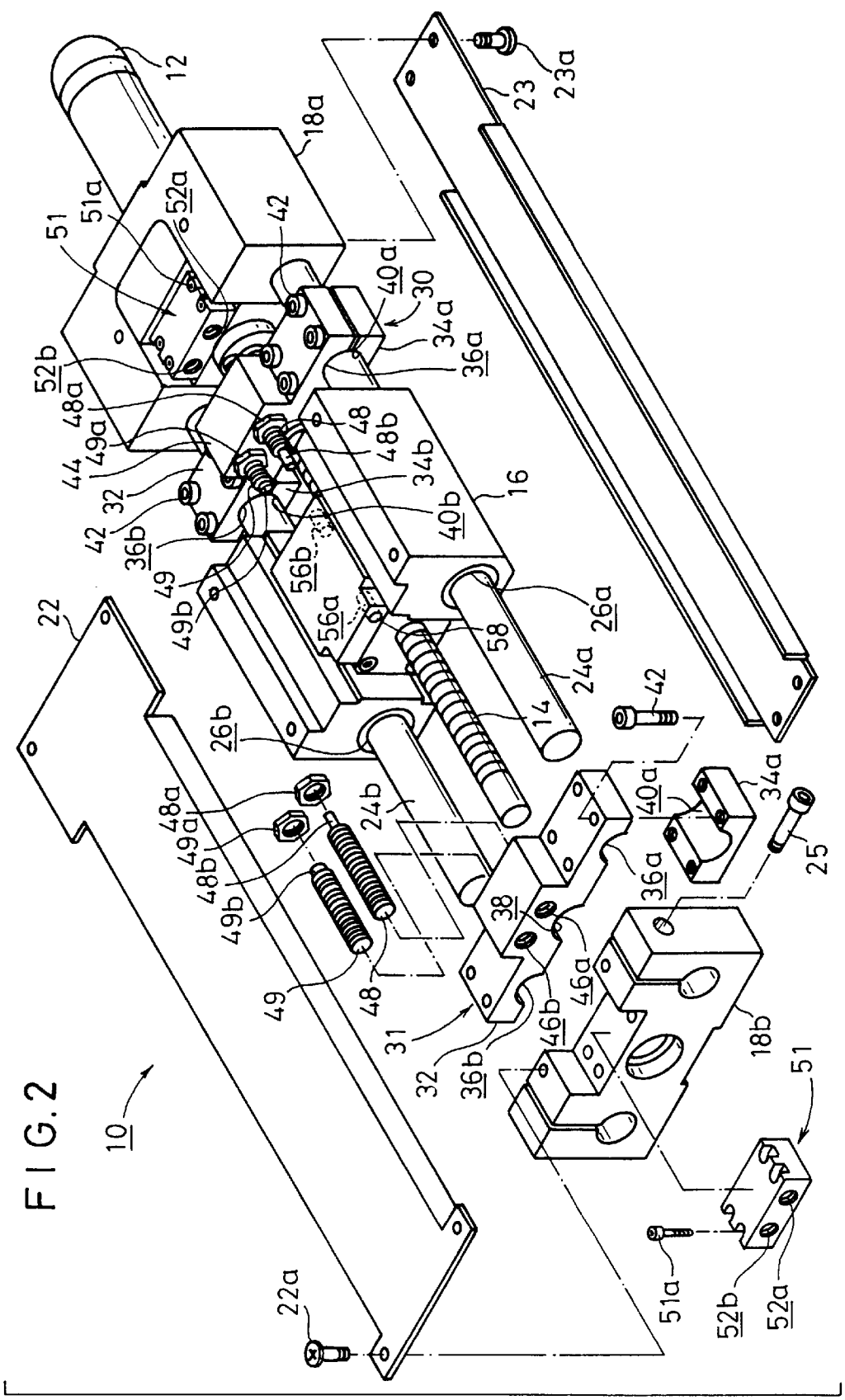
FIG. 2 is a schematic exploded perspective explanatory view of the actuator shown in FIG. 1.

As shown in FIG. 2, socket members 51 are respectively mounted on the support bases 18a, 18b by means of screws 51a. Holes 52a, 52b are formed in these socket members 51 in a penetrating manner and coaxially with holes 46a, 46b formed in the substrate members 32. The shock absorbers 48 and the adjusting bolts 49 are mounted in these holes 52a, 52b in case the stoppers 30, 31 are not used.

As shown in FIG. 3, portions of both side surfaces of the table 16 which face the stopper members 30 and the stopper members 31 in an opposing manner and which come into contact with the shock absorbers 48 are provided with holes 56a, 56b, and pin members 58 are respectively inserted into these holes 56a, 56b. With the provision of these pins 58, any damage to the table 16 which may occur when the table 16 comes into contact with the shock absorbers 48 can be avoided.

The actuator 10 according to the present invention substantially has the above-mentioned construction, and the operation, effects, and advantages thereof are explained hereinafter.

Upon actuation of the motor 12, the ball screw 14 is rotated and along with this rotation, the table 16 is moved along the axial direction (the direction indicated by arrow A in FIG. 1) of the ball screw 14. In this case, by changing over the direction of the rotational driving of the motor 12, the moving direction of the table 16 is changed over.

When the table 16 is displaced in a direction to approach the motor 12 and reaches a position where one stopper member 30 is fixedly secured, the table 16 has its way interrupted by the stopper member 30 and accordingly stops.

In the same manner, when the table 16 is displaced in a direction away from the motor 12 and reaches a position where the other stopper member 31 is fixedly secured, the table 16 has its way interrupted by the stopper member 31 and accordingly stops.

In this case, the stop positions of the table 16 are determined by adjusting bolts 49 which are respectively mounted on the stopper member 30 and the stopper member 31. Furthermore, the impact which is generated when the table 16 comes into contact with the adjusting bolts 49 is attenuated by shock absorbers 48 respectively mounted on the stopper member 30 and the stopper member 31.

In this manner, with the actuator 10 according to the present invention, the table 16 is stopped when the table 16 comes into contact with the stopper members 30, 31 and hence, it is unnecessary to stop the table 16 by controlling the drive of the motor 12.

In this case, it is unnecessary to provide detection means for obtaining the stop position of the table 16 to the actuator 10. To be more specific, it is unnecessary to provide detection means (magnetic sensors, limit switches or the like) for directly detecting the position of the table 16 in a direction along the ball screw 14, or detection means (encoders or the like) for indirectly detecting the position of the table 16 based on the rotational angle of the motor 12. Accordingly, the actuators 10 can be manufactured at a low cost. Especially, since the motor 12 is not required to have the rapid stop operation ability, it is possible to adopt low-cost motors as the motor 12.

Additionally, the stopper members 30, 31 can be fixed to a given position of the shafts 24a, 24b using the screw members 42. Accordingly, the movable range of the table 16 can be arbitrarily set corresponding to mounting positions of the stopper members 30, 31.

Furthermore, the stopper members 30, 31 comprise the substrate members 32 and fixing members 34a, 34b which are arranged in such a manner that they sandwich the shafts 24a, 24b. Furthermore, the substrate members 32 and the fixing members 34a, 34b are fixedly secured to the shafts 24a, 24b by the fastening force of the screw members 42 working between the substrate members 32 and the fixing members 34a, 34b. Accordingly, an operation to mount the stopper members 30, 31 to the shafts 24a, 24b or an operation to remove the stopper members 30, 31 from the shafts 24a, 24b is facilitated.

Still furthermore, the shock absorbers 48 and the adjusting bolts 49 are disposed close to each other at the projections 44. Accordingly, an action to restrict the movable range of the table 16 by means of the adjusting bolts 49 and an action to attenuate the impact which is generated when the table 16 and the adjusting bolts 49 come into contact with each other by means of the shock absorbers 48 are carried out simultaneously. It is also possible to make the stopper members 30, 31 compact.

Still furthermore, the distance from the projections 44 to the distal end portions of the shock absorbers 48 and the adjusting bolts 49 can be finely adjusted by moving the positions of the nut members 48a, 49a, so that the movable range of the table 16 can be finely adjusted correspondingly.

As has been described heretofore, according to the actuator of the present invention, the table is stopped when the table comes into contact with the stopper members and the movable range of the table is restricted. Accordingly, it is unnecessary to provide position detection means for the actuator which is necessary in case the stop operation of the table is carried out by controlling the drive of motor.

Furthermore, the motor is not requested to meet the response characteristics of a high precision, and hence a low-cost motor can be used. Furthermore, the reduction of the manufacturing cost of the actuators can be realized.

What is claimed is:

1. An actuator comprising:
   a screw shaft connected to a drive source and being rotatably driven;
   a table engaged with said screw shaft and movable relative to said screw shaft;
   guide members provided for guiding said table; and
   stopper members fixedly secured to said guide members,
   wherein a stop operation and a restriction of a movable range of said table are carried out by making said table come into contact with said stopper members.

2. An actuator according to claim 1, wherein said guide members comprise shafts which pass through guide holes formed in said table.

3. An actuator according to claim 2, wherein said stopper members are mounted on said shafts and at given stop positions of said table.

4. An actuator according to claim 3, wherein said stopper members are fixedly secured to said shafts by means of screw members.

5. An actuator according to claim 3, wherein said stopper members comprise one pair or a plurality of pairs of block bodies which are arranged in such a manner that said block bodies sandwich said shafts.

6. An actuator according to claim 5, wherein said stopper members include adjusting bolts which are fixedly secured to said block bodies and carry out said stop operation and said restriction of movable range of said table by coming into contact with said table.

7. An actuator according to claim 6, wherein damper members are mounted on distal end portions of said adjusting bolts.

8. An actuator according to claim 6, wherein nut members are mounted on said adjuster bolts and positions of distal end portions of said adjusting bolts are determined by said nut members.

9. An actuator according to claim 6, wherein said stopper members include shock absorbers which are fixedly secured to said block bodies and attenuate an impact which occurs when said table comes into contact with said adjusting bolts.

10. An actuator according to claim 9, wherein said shock absorbers include rods which are biased in a direction toward distal ends thereof.

11. An actuator according to claim 9, wherein nut members are mounted on said shock absorbers and positions of distal ends of said shock absorbers are determined by said nut members.

12. An actuator according to claim 9, wherein said adjusting bolts and said shock absorbers are arranged close to each other.

13. An actuator according to claim 10, wherein portions of said table which come into contact with said rods are provided with pins.

* * * * *